US009355181B2

(12) United States Patent
Bannur et al.

(10) Patent No.: US 9,355,181 B2
(45) Date of Patent: May 31, 2016

(54) SEARCH RESULT AUGMENTING

(71) Applicant: Microsoft Corporation, Redmond, WA (US)

(72) Inventors: Sushma Nagesh Bannur, Cupertino, CA (US); Omar Alonso, Redwood Shores, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 215 days.

(21) Appl. No.: 13/964,888

(22) Filed: Aug. 12, 2013

(65) Prior Publication Data

US 2015/0046442 A1 Feb. 12, 2015

(51) Int. Cl.
*G06F 17/30* (2006.01)

(52) U.S. Cl.
CPC .... *G06F 17/30867* (2013.01); *G06F 17/30637* (2013.01); *G06F 17/30696* (2013.01)

(58) Field of Classification Search
None
See application file for complete search history.

(56) References Cited

U.S. PATENT DOCUMENTS

| | | | | | |
|---|---|---|---|---|---|
| 7,096,214 | B1 * | 8/2006 | Bharat | ............. | G06F 17/30864 707/708 |
| 7,386,543 | B1 * | 6/2008 | Bharat | ............. | G06F 17/30864 |
| 8,700,615 | B2 * | 4/2014 | Jones | ................ | G06F 17/30648 705/12 |
| 2008/0215571 | A1 * | 9/2008 | Huang | ............. | G06F 17/30719 |
| 2009/0150387 | A1 * | 6/2009 | Marchewitz | ...... | G06F 17/30864 |
| 2009/0164929 | A1 | 6/2009 | Chen et al. | | |
| 2009/0193328 | A1 | 7/2009 | Reis et al. | | |
| 2009/0281988 | A1 | 11/2009 | Yoo | | |
| 2009/0299853 | A1 * | 12/2009 | Jones | ................ | G06Q 30/02 705/14.46 |
| 2009/0319436 | A1 * | 12/2009 | Andra et al. | ............ | 705/80 |
| 2010/0169317 | A1 | 7/2010 | Wang et al. | | |
| 2011/0202617 | A1 * | 8/2011 | Naidu | ............ | G06Q 10/10 709/206 |
| 2011/0307466 | A1 * | 12/2011 | Prakash et al. | ............. | 707/707 |
| 2011/0313989 | A1 * | 12/2011 | Ghosh et al. | ................ | 707/706 |
| 2012/0278355 | A1 | 11/2012 | Kritt et al. | | |
| 2012/0310927 | A1 * | 12/2012 | Johnson | ............ | G06F 17/30864 707/723 |
| 2013/0297551 | A1 * | 11/2013 | Smith | ............. | H04L 51/20 706/48 |
| 2013/0312464 | A1 * | 11/2013 | Davis | ................ | F16F 15/366 68/212 |
| 2014/0259185 | A1 * | 9/2014 | Cockcroft | .............. | G06F 21/10 726/28 |
| 2015/0089409 | A1 * | 3/2015 | Asseily et al. | ................ | 715/765 |

OTHER PUBLICATIONS

Int. Search Report cited in PCT Application No. PCT/US2014/050251 dated Dec. 23, 2014, 12 pgs.

(Continued)

*Primary Examiner* — Hung Le
(74) *Attorney, Agent, or Firm* — Dave Ream; Tom Wong; Micky Minhas (57) ABSTRACT

One or more techniques and/or systems are provided for augmenting search results with a user defined suggestion and/or for providing a user defined suggestion. For example, a venue entity may be associated with search results and/or user information (e.g., a set of search results may correspond to the Eiffel Tower). User defined data associated with the venue entity may be evaluated to generate a user defined suggestion associated with the venue entity. For example, user generated content about the Eiffel Tower, such as tips, advice, opinions, and/or other information specified by social network users, may be evaluated to determine a user defined suggestion "get tower tickets early, they sell out fast". The user defined suggestion may be provided to a user (e.g., visiting the venue entity) and/or used to augment the set of search results. In this way, practical information, derived from opinions shared by other users, may be provided.

20 Claims, 8 Drawing Sheets

(56) References Cited

OTHER PUBLICATIONS

Claster, et al., "Thailand—Tourism and Conflict. Modeling Sentiment from Twitter Tweets using Naïve Bayes and Unsupervised Artificial Neural Nets", Retrieved at <<http://www.geo-informatics.org/publications/Thailand_Tourism%20and%20Conf%20ict_4262a089.pdf>>, In Second International Conference on Computational Intelligence, Modelling and Simulation, Sep. 28, 2010, pp. 6.

Ganesan, et al., "FindiLike: Preference Driven Entity Search", Retrieved at <<http://www2012.wwwconference.org/proceedings/companion/p345.pdf>>, In Proceedings of the 21st International Conference Companion on World Wide Web, Apr. 16, 2012, pp. 4.

Yatani, et al., "Review Spotlight: A User Interface for Summarizing User-generated Reviews Using Adjective-Noun Word Pairs", Retrieved at <<http://yatani.jp/paper/CHI2011.pdf>>, In ACM CHI Conference on Human Factors in Computing Systems, May 7, 2011, pp. 10.

Carenini, et al., "Interactive Multimedia Summaries of Evaluative Text", Retrieved at <<http://www.eecs.berkeley.edu/~adpauls/PAPERS/iui06.pdf>>, In Proceedings of the 11th International Conference on Intelligent User Interfaces, Jan. 29, 2006, pp. 8.

Carvalho, et al., "Exploring User Generated Data Visualization in the Accommodation Sector", Retrieved at <<http://repositorio-cientifico.uatlantica.pt/bitstream/10884/647/1/IV2012_submitted.pdf>>, In 16th International Conference on Information Visualisation, Jul. 11, 2012, pp. 6.

Bakliwal, et al., "Entity Centric Opinion Mining from Blogs", Retrieved at <<http://www.aclweb.org/anthology/W/W12/W12-5306.pdf>>, In Proceedings of the 2nd Workshop on Sentiment Analysis where AI meets Psychology, Dec. 2012, pp. 12.

Hu, et al., "Mining and Summarizing Customer Reviews", Retrieved at <<http://users.cis.fiu.edu/~lli003/Sum/KDD/2004/p168-hu.pdf>>, In Proceedings of the Tenth ACM SIGKDD International Conference on Knowledge Discovery and Data Mining, Aug. 22, 2004, pp. 10.

Carenini, et al., "A Multimedia Interface for Facilitating Comparisons of Opinions", Retrieved at <<http://www.cs.ubc.ca/~carenini/PAPERS/IUI09-PUBLISHED.pdf>>, In Proceedings of the 14th International Conference on Intelligent User Interfaces, Feb. 8, 2009, pp. 10.

Jain, et al., "Topical Organization of User Comments and Application to Content Recommendation", Retrieved at <<http://www.cs.helsinki.fi/u/galbrun/misc/TOUC_WWW13_preprint.pdf>>, In 22nd International World Wide Web Conference, May 13, 2013, pp. 2.

\* cited by examiner

SEARCH RESULT AUGMENTING

BACKGROUND

Many users may discover, explore, and/or interact with content through various devices and/or applications. In an example, a user may maintain a social network profile with a social network service. For example, Dave may maintain a social network profile through which Dave may share opinions, tips, and/or advice on vacations that Dave has experienced. In another example, a user may maintain a blog through a microblog social network service. For example, Mary may write her opinion about running, trails, shoes, and/or other information regarding interests of Mary. Because the social network service, the microblog social network service, and/or other content sources may expose a vast amount of information, such as information related to entities and/or venue entities (e.g., a location, a business, a building, a park, a monument, a shopping mall, etc.), that may be arduous for a user to sift through, the user may be unable to discover information that may be relevant to the user (e.g., a user may be planning a vacation to a national park venue entity that Dave has written about, but the user may not discover the social network profile of Dave while researching the vacation).

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for providing a user defined suggestion and/or for augmenting search results with a user defined suggestion are provided herein. For example, users may share tips, opinions, advice, and/or other information through content sources, such as social networks, websites, articles, etc. Such information may be identified as user defined data associated with a venue entity (e.g., a user written review of an Eiffel Tower tour; a social network post about a restaurant near Pike Place Market, etc.). A venue entity may correspond to a location, business, building, and/or any other venue (e.g., a restaurant, a monument, a park, a lake, a shopping mall, etc.). Accordingly, user defined data, associated with the venue entity, may be mined, evaluated, etc. to generate a user defined suggestion that may be provided to a user. The user defined suggestion may comprise a descriptive summary of the user defined data (e.g., tips, opinions, and/or advice associated with Pike Place Market may be aggregated to generate a user defined suggestion summarizing such information about the Pike Place Market). It may be appreciated that in one example, a candidate user suggestion may correspond to raw user specified information (e.g., a textual string submitted by a user as a tip, an opinion, etc.), and that the user defined suggestion may correspond to a descriptive summary that is constructed using information extracted from one or more candidate user suggestions. For example, the user defined suggestion may comprise an image, a video, audio, a textual description, etc., obtained using data, metadata, information, etc. mined, extracted, etc. from one or more candidate user suggestions.

In an example of augmenting search results with a user defined suggestion, a venue entity, associated with a set of search results corresponding to a search query, may be identified. For example, a user may submit a search query "Cleveland Amusement Park". A set of search results, relevant to the search query, may be identified (e.g., a roller coaster history website, a Cleveland Amusement Park entity pane describing various information about the Cleveland Amusement Park, and/or other content relevant to the Cleveland Amusement Park). A Cleveland Amusement Park entity may be identified from the set of search results. User defined data may be obtained and/or evaluated to generate a user defined suggestion associated with the venue entity. For example, social networks, blogs, microblogs, websites, and/or other content sources through which users may share tips, opinions, and/or advice may be searched for user defined data relating to the Cleveland Amusement Park entity (e.g., "don't ride the Twisted Thriller, it hurt my neck"; "don't forget to try the candy store before you leave"; "the Green Tower was an awesome ride"; etc.). A user defined suggestion may be generated from the user defined data. In an example, the user defined suggestion may comprise a descriptive summary constructed from the user defined data (e.g., a descriptive statement summarizing various user defined suggestions within the user defined data, such as "Visitors love the Green Tower ride" may summarize a plurality of user opinions about the Green Tower ride). In another example, the user defined suggestion may comprise the user defined data or a portion thereof (e.g., an opinion having a relatively high rank, a number of positive endorsements, etc.). In an example, the user defined suggestion may comprise a video (e.g., of the Green Tower ride) and/or any other presentation. The set of search results may be augmented with the user defined suggestion to create an augmented set of search results that may be provided in response to the search query. In an example, the set of search results may be augmented with a textual description, image, and/or other types of content that may be derived from the user defined suggestion.

In an example of providing a user defined suggestion, a venue entity may be identified based upon user information associated with a user of a device. For example, an email, a file, a current device location, a calendar entry, a social network profile, and/or a variety of other information associated with the user and/or the device may be evaluated to identify the venue entity (e.g., a calendar entry may specify "upcoming NYC vacation"). User defined data of a social network (e.g., a website through which users may share tips, opinions, and/or advice; a microblog service; a blog service; a forum service; etc.) may be evaluated to generate a user defined suggestion associated with the venue entity. For example, the user defined suggestion may comprise a descriptive summary of a set of candidate user suggestions extracted from the user defined data (e.g., the user defined suggestion may comprise a textual description "Don't forget to see the new Broadway Show—Magic" and/or an image associated with the Broadway Show—Magic). The user defined suggestion may be provided to the device. For example, an alert message, comprising the user defined suggestion, may be displayed to the user (e.g., the alert message may be provided in response to the user performing an action associated with the NYC vacation, such as viewing a vacation website, sending a vacation email, engaging in a vacation conversation, having a current location corresponding to NYC, etc.). In this way, practical information (e.g., as opposed to merely factual information, such as information provided by an encyclopedia website) may be provided based upon tips, opinions, and/or advice shared by other users based upon experiences of such users. It will be appreciated that presenting one or more user defined suggestions may allow a user to obtain, find, etc. additional information (e.g., likely to be of interest to the user). For example, a user may click on or otherwise activate "clam chowder" that is presented in a user defined suggestion for Pike Place Market. As a result, a search query of "clam chowder Pike Place Market" could be triggered such that a search engine would provide search results of venues in Pike Place Market that serve clam chowder, as opposed to general search results regarding clam chowder (e.g., recipes for clam chowder). Thus, presenting a user defined suggestion may allow a user to efficiently obtain more relevant, accurate, etc. search results.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

Figure 1:
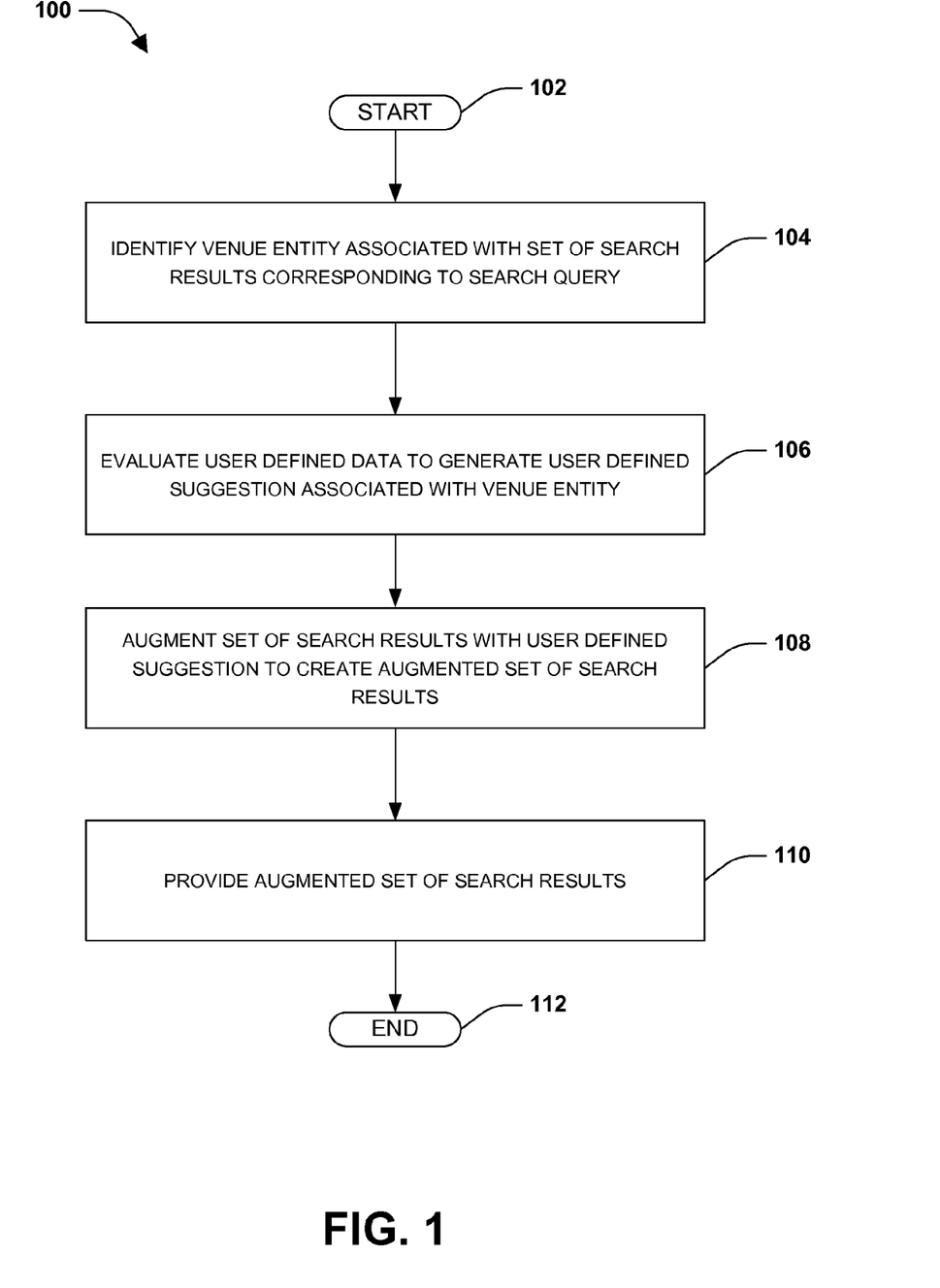
FIG. 1 is a flow diagram illustrating an exemplary method of augmenting search results with a user defined suggestion.

An embodiment of augmenting search results with a user defined suggestion is illustrated by an exemplary method 100 of FIG. 1. At 102, the method starts. At 104, a venue entity, associated with a set of search results corresponding to a search query, may be identified. For example, a user may submit a search query "zoo in PA". A set of search results relevant to the search query may be retrieved (e.g., a history of zoos website, a Pittsburgh Zoo social network profile, a vacation website, a Pittsburgh Zoo entity pane comprising a summary description of the Pittsburgh Zoo entity, and/or other content relevant to the "zoo in PA" search query may be retrieved). A venue entity, such as a Pittsburgh Zoo entity, may be identified from the search results and/or the search query.

At 106, user defined data may be evaluated to generate a user defined suggestion associated with the venue entity. In an example, the user defined data may be crawled, mined, evaluated, etc. offline before the search query is submitted, and thus the user defined data and/or user defined suggestions generated from the user defined data may be available for augmenting the set of search results before the search query is submitted. In another example, the user defined data may be obtained and/or the user defined suggestion may be generated in real time (e.g., the user defined suggestion may be generated in real time because the user defined suggestion may be tailored based upon information about the user that submitted the search query, such as social network information and/or search history of the user that may indicate topics and/or suggestions that may be interesting to the user). The user defined data may correspond to any information specified by a user, such as a tip, a suggestion, and/or an opinion specified by a user through a social network or other content source.

In an example, a set of candidate user suggestions, corresponding to the venue entity, may be extracted from a social network (e.g., "don't forget to feed the lamas", "stay away from hot dogs, they made us sick", "my daughter loved the elephant ride", and/or other user specified information). A candidate graph comprising one or more nodes connected by one or more edges may be generated based upon the set of candidate user suggestions (e.g., candidate graph 214 of FIG. 2). A node may represent a candidate user suggestion, and an edge between two nodes may represent a similarity between the two nodes. For example, a first node, representing a first candidate user suggestion, may be connected to a second node, representing a second candidate user suggestion, by a first edge based upon the first candidate user suggestion corresponding to the second candidate user suggestion above a correspondence threshold (e.g., a "stay away from hot dogs, they made us sick" candidate user suggestion and a "the food, especially the hot dogs, were gross" may have a relatively high correspondence above the correspondence threshold, and thus nodes representing such candidate user suggestions may be connected by an edge). One or more suggestion category clusters may be generated based upon the candidate graph. For example, a first suggestion category cluster may comprise one or more nodes connected by at least one edge (e.g., the first suggestion category cluster may comprise nodes corresponding to user opinions on hot dogs; a second suggestion category cluster may comprise nodes corresponding to user opinions on feeding lamas; a third suggestion category cluster may comprise nodes corresponding to user opinions on elephant rides; etc.). Respective nodes within a suggestion category cluster may be evaluated to generate the user defined suggestion as a descriptive summary of candidate user suggestions represented by nodes within the suggestion category cluster. For example, respective nodes within the first suggestion category cluster may be evaluated to generate the user defined suggestion as a descriptive summary of candidate user suggestions represented by nodes within the first suggestion category cluster.

In an example, the user defined suggestion may correspond to a first suggestion category (e.g., a "make sure to ride the elephants" user defined suggestion corresponding to an elephant rides suggestion category). A second user defined suggestion, corresponding to a second suggestion category (e.g., a "my daughter loved the lama feeding" user defined suggestion corresponding to a feed lamas suggestion category) may be generated from the user defined data. In this way, one or more user defined suggestions may be generated for various suggestion categories. In another example, one or more user defined suggestions may be generated for a suggestion category, such as a third user defined suggestion corresponding to the first suggestion category (e.g., a "get elephant ride tickets at the gate to make sure you don't miss out" user defined suggestion corresponding to the elephant rides suggestion category).

At 108, the set of search results may be augmented with the user defined suggestion to create an augmented set of search results. In an example, the user defined suggestion may be used to augment a location aware interface within the set of search results (e.g., a Pittsburgh Zoo entity pane comprising a summary and/or imagery associated with the Pittsburgh Zoo entity). In another example, an image corresponding to the user defined suggestion may be identified (e.g., a search engine, social network, a photo sharing service, and/or other content sources may be searched to identify a picture of a child feeding a lama at the Pittsburgh Zoo). The set of search results may be augmented with the image. In another example, a video corresponding to the user defined suggestion may be identified and/or used to augment the set of search results. In an example, one or more user defined suggestions may be used to augment the set of search results. A first user defined suggestion, a second user defined suggestion, and/or other user defined suggestions may be displayed in a ranked order, such as through a treemap. For example, the first user defined suggestion may be displayed in a relatively more prominent position within the treemap than the second user defined suggestion based upon the first user defined suggestion being assigned a first popularity rank greater than a second popularity rank of the second user defined suggestion due to a number of users discussing the first user defined suggestion being greater than a number of users discussing the second user defined suggestion.

At 110, the augmented set of search results may be provided in response to the search query. For example, the augmented set of search results may be displayed through a search result interface (e.g., a website search interface, an operating system search interface such as a search charm, etc.). In an example, an action may be associated with the user defined suggestion provided through the augmented set of search results. Responsive to selection of the user defined suggestion, the action may be performed (e.g., a display image action, a display map location action, a display weather action, a display social network profile action, a provide supplemental information action, and/or any other action). In this way, practical information corresponding to tips, opinions, and/or advice shared by user(s) may be provided. At 112, the method ends.

Figure 2:
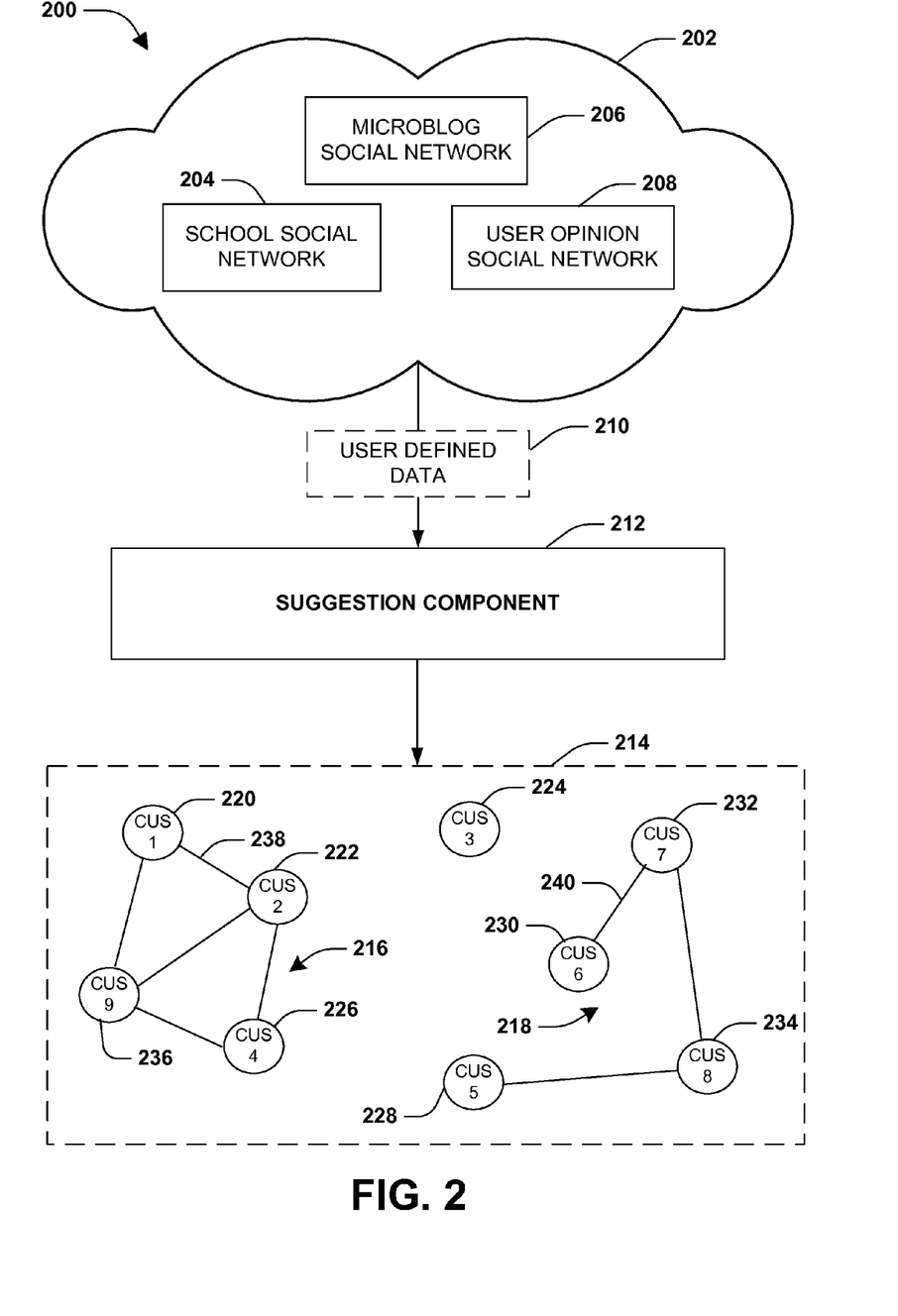
FIG. 2 is a component block diagram illustrating an exemplary system for generating a candidate graph.

FIG. 2 illustrates an example of a system 200 for generating a candidate graph 214. The system 200 may comprise a suggestion component 212. The suggestion component 212 may be configured to crawl social network data sources 202 (e.g., a school social network 204, a microblog social network 206, a user opinion social network 208, and/or other content sources through which users may express tips, opinions, advice, and/or other information) to obtain user defined data 210 associated with a venue entity. For example, the user defined data 210 may comprise one or more candidate user suggestions (CUSs) corresponding to a Pike Place Market entity, such as a first candidate user suggestion 220 (e.g., "the clam chowder was awesome"), a second candidate user suggestion 222 (e.g., "don't forget to try the chowder"), a third candidate user suggestion 224 (e.g., "not sure how I felt about Pike Place"), a fourth candidate user suggestion 226 (e.g., "Bob's has the best clam chowder!!"), a fifth candidate user suggestion 228 (e.g., "the gum wall was a cool place to visit"), a sixth candidate user suggestion 230 (e.g., "take lots of pictures of gum wall"), a seventh candidate user suggestion 232 (e.g., "my daughter put gum on the gum wall"), an eighth candidate user suggestion 234 (e.g., "I bought a gum wall post card"), a ninth candidate user suggestion 236 (e.g., "the clam chowder was tasty!!"), and/or other candidate user suggestions corresponding to tips, advice, and/or opinions of the Pike Place Market entity extracted from the social network data sources 202 as the user defined data 210. In an example, the user defined data 210 may be filtered based upon various filters, such as an adult content filter, a spam filter, an offensive content filter, and/or a variety of other filters that may be used to automatically discard one or more candidate user suggestions within the user defined data 210.

In an example, the user defined data 210 (e.g., after being filtered) may be ranked using positive weighted features and/or negative weighted features. In an example, positive weighted features may comprise a number of stop words, a number of adjectives, a number of verbs, a candidate user suggestion comprising a day of a week, a number of conjunctions, a candidate user suggestion specifying desired words, a candidate user suggestion specifying positive superlatives or comparatives, a candidate user suggestion specifying hours or time, a candidate user suggestion specifying a food item, a candidate user suggestion specifying a discount, a candidate user suggestion specifying money, a candidate user suggestion specify desired bigrams, a candidate user suggestion ending with a full-stop, a candidate user suggestion ending with an exclamation, a candidate user suggestion specifying a name of a person, a candidate user suggestion comprising an emoticon, a candidate user suggestion that is similar to other candidate user suggestions of the venue entity, etc. In an example, negative weighted features may comprise an exact duplicate text count, a number of words, a candidate user suggestion starting with upper-case, a number of prepositions, a number of pronouns, a relatively long candidate user suggestion, a candidate user suggestion specifying a phone number, a candidate user suggestion comprising a URL, a number of nouns, a candidate user suggestion specifying negative superlatives or comparatives, a candidate user suggestion comprising profane words, a candidate user suggestion length, a candidate user suggestion that specifies expired information (e.g., information about a Pike Place Market store that has closed for business), a candidate user suggestion comprising punctuation (e.g., a comma), etc. Candidate user suggestions having rankings below a utility threshold may be removed from the user defined data 210 (e.g., a "check out www.MySpamWebsite.com for Pike Market Place news" may be detected as comprising spam content based upon the URL, and thus removed from the user defined data 210; a "I hate Dave—at the Pike Place Market Dave and Mary were acting like #$%@!" may be removed from the user defined data 210 based upon nouns, profane words, and/or negative superlatives).

The suggestion component 212 may represent the candidate user suggestions within the candidate graph 214 as nodes. In an example, one or more candidate edges may be used to connect nodes representing candidate user suggestions that are similar above a correspondence threshold. In an example, a first node, representing the first candidate user suggestion 220 of "the clam chowder was awesome" may be connected by a first edge 238 to a second node, representing the second candidate user suggestion 222 of "don't forget to try the chowder", because the first candidate user suggestion 220 is similar to the second candidate user suggestion 222 above the correspondence threshold (e.g., based upon the occurrence of "chowder"). In another example, a third node, representing the third candidate user suggestion 224 of "not sure how I felt about Pike Place", may not be connected to other nodes because the third candidate user suggestion 224 may not corresponding to other candidate user suggestions above the correspondence threshold. In another example, a sixth node, representing the sixth candidate user suggestion 230 of "take lots of pictures of gum wall" may be connected by a second edge 240 to a seventh node, representing the seventh candidate user suggestion 232 of "my daughter put gum on the gum wall", because the sixth candidate user suggestion 230 is similar to the seventh candidate user suggestion 232 above the correspondence threshold (e.g., based upon the occurrence of "gum wall"). In this way, the candidate graph 214 may be generated.

The suggestion component 212 may be configured to generate one or more suggestion category clusters based upon the candidate graph 214. For example, a clam chowder suggestion category cluster 216 comprising the first node, the second node, a fourth node representing the fourth candidate user suggestion 226, and a ninth node representing the ninth candidate user suggestion 236 may be generated based upon such nodes being connected by edges. A clam chowder user defined suggestion may be generated for the clam chowder suggestion category cluster 216 as a descriptive summary of the candidate user suggestions represented by nodes within the clam chowder suggestion category cluster 216 (e.g., "Try the clam chowder at Pike Place Market"). A gum wall suggestion category cluster 218 comprising the sixth node, the seventh node, an eighth node representing the eighth candidate user suggestion 234, and a fifth node representing the fifth candidate user suggestion 228 may be generated based upon such nodes being connected by edges. A gum wall user defined suggestion may be generated for the gum wall suggestion category cluster 218 as a descriptive summary of the candidate user suggestions represented by nodes within the gum wall suggestion category cluster 218 (e.g., "Make sure to visit the gum wall"). In an example, the third node may be removed from the candidate graph 214 because the third candidate user suggestion 224 may be deemed as unhelpful and/or noise because the third candidate user suggestion 224 is not similar to other candidate user suggestions, and is thus not connected to at least one other node. In this way, one or more user defined suggestions may be generated based upon the user defined data 210.

In an example, the user defined data 210 may be refreshed at a refresh interval (e.g., a continual refresh, a refresh at a time interval, a refresh based upon a trigger event such as identification of a new business opening, a business closing, an upcoming festival or event, etc.). In this way, the user defined data 210 may comprise fresh candidate user suggestions as opposed to stale candidate user suggestions. In an example, a candidate user suggestion about a restaurant at the Pike Place Market may be removed during a refresh based upon the restaurant being closed and/or a lack of candidate user suggestions regarding the restaurant. In another example, a new candidate user suggestion about an upcoming festival may be added to the user defined data 210 during a refresh.

Figure 3:
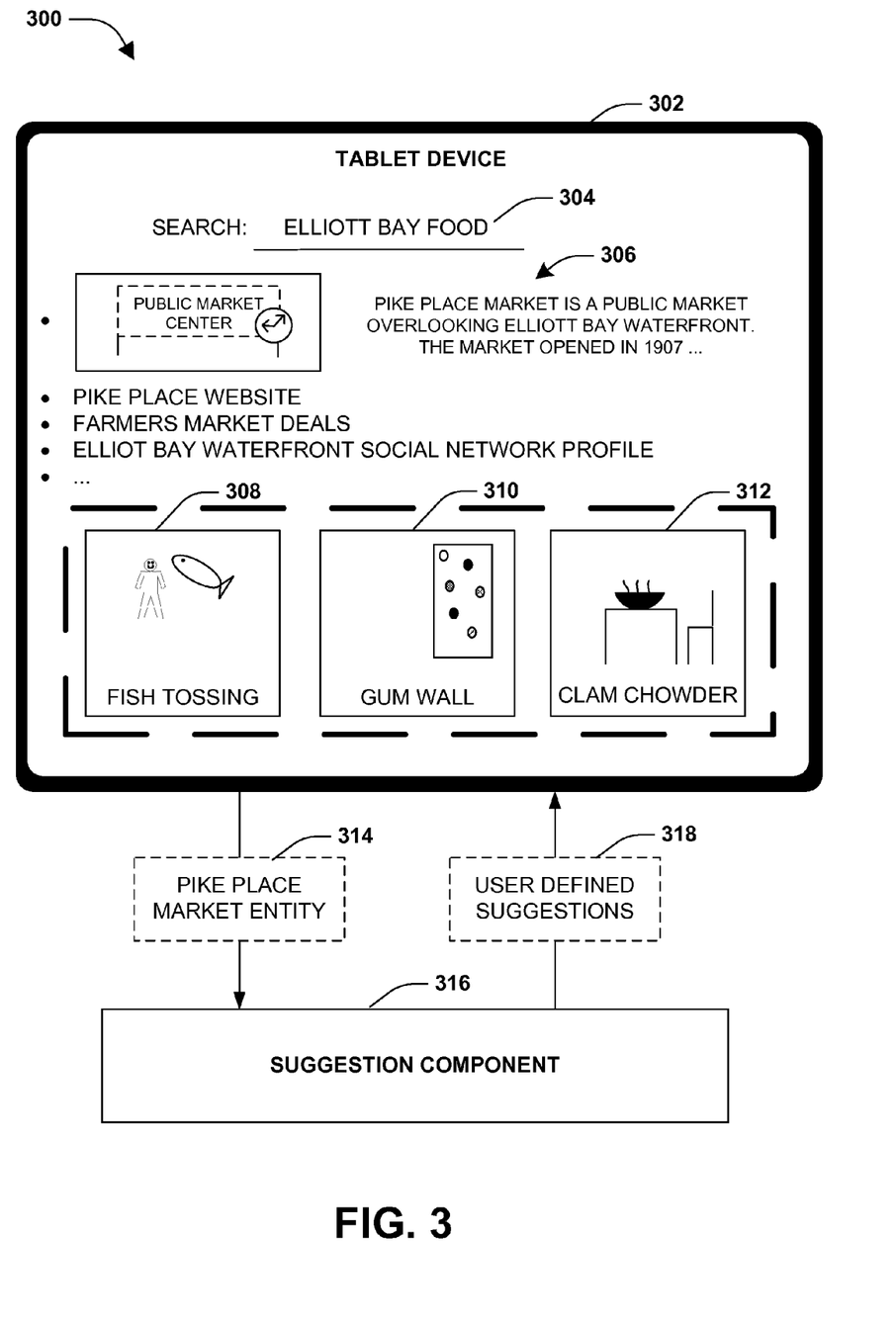
FIG. 3 is a component block diagram illustrating an exemplary system for providing user defined suggestions.

FIG. 3 illustrates an example of a system 300 for providing user defined suggestions 318. The system 300 may comprise a suggestion component 316. The suggestion component 316 may be associated with a tablet device 302 hosting a search interface. A search query 304 of "Elliot Bay food" may have been submitted through the search interface. A set of search results 306 corresponding to the search query 304 may be retrieved (e.g., a Pike Place Market entity pane comprising an image and description of Pike Place Market, a Pike Place website, Farmers Market Deals, an Elliot Bay Waterfront social network profile, and/or other search results relevant to "Elliot Bay food").

The suggestion component 316 may be configured to identify a venue entity associated with the set of search results 306, such as a Pike Place Market entity 314. The suggestion component 316 may be configured to evaluate user defined data to generate user defined suggestions 318 associated with the Pike Place Market entity 314, such as a fish tossing user defined suggestion 308, a gum wall user defined suggestion 310, and/or a clam chowder user defined suggestion 312. For example, social network data may be evaluated to identify one or more candidate user suggestions relating to fish tossing occurring at the Pike Place Market, one or more candidate user suggestions relating to a gum wall at the Pike Place Market, and one or more candidate user suggestions relating to clam chowder available at the Pike Place Market. Such candidate user suggestions may be evaluated to generating the fish tossing user defined suggestion 308, the gum wall user defined suggestion 310, and/or the clam chowder user defined suggestion 312. Images associated with such user defined suggestions may be retrieved, such as an image of a vendor tossing a fish, a picture of the gum wall, and a picture of clam chowder. In this way, the user defined suggestions and/or the images may be used to augment the set of search results 306. In an example, an action may be associated with a user defined suggestion. For example, responsive to a selection of the clam chowder user defined suggestion 312, a table reservation app may be launched into a contextually relevant state so that a user may reserve a table at a Pike Place Market restaurant that serves clam chowder.

Figure 4:
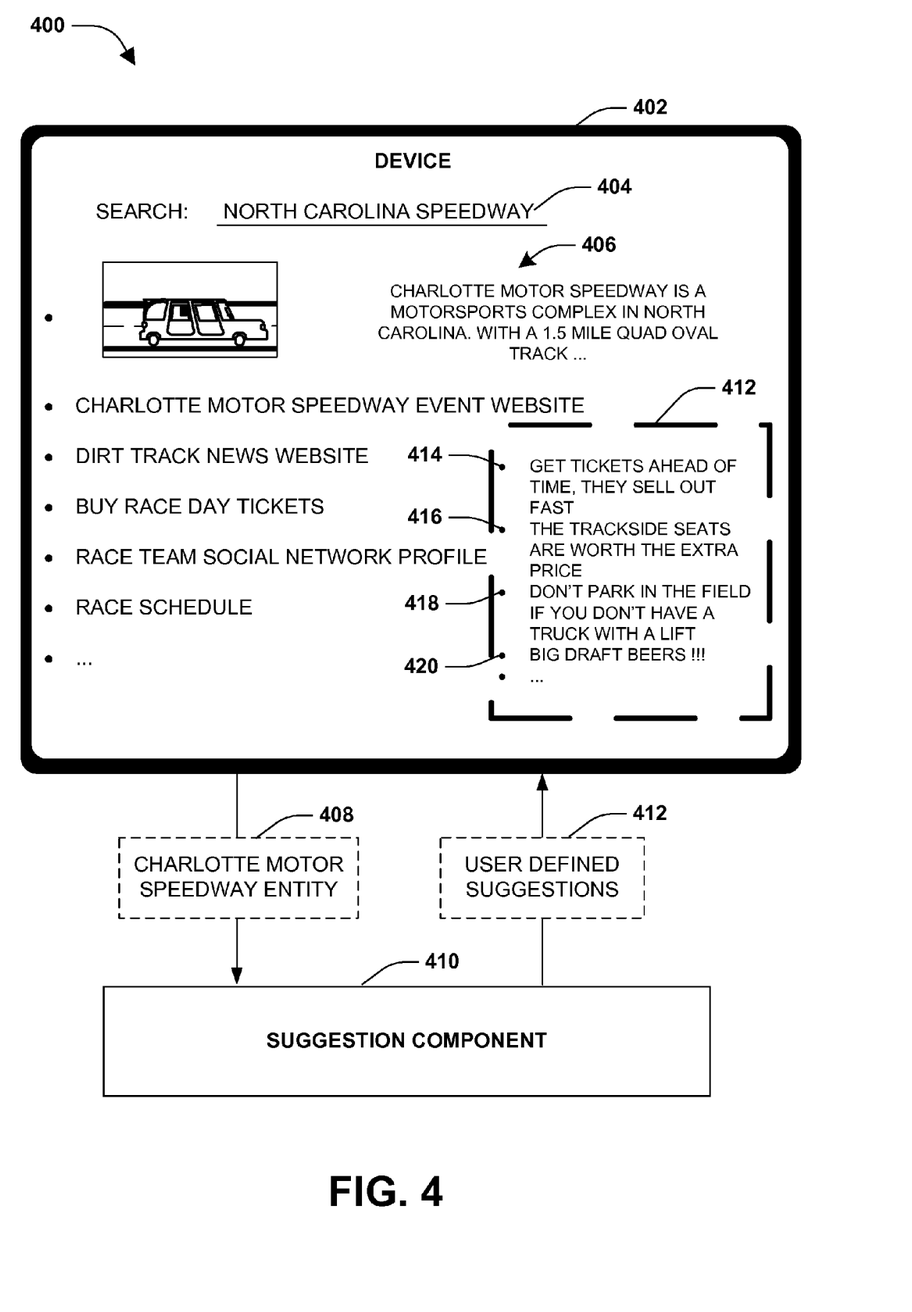
FIG. 4 is a component block diagram illustrating an exemplary system for providing user defined suggestions.

FIG. 4 illustrates an example of a system 400 for providing user defined suggestions 412. The system 400 may comprise a suggestion component 410. The suggestion component 410 may be associated with a device 402 hosting a search interface. A search query 404 of "North Carolina Speedway" may have been submitted through the search interface. A set of search result 406 corresponding to the search query 404 may be retrieved (e.g., a Charlotte Motor Speedway entity pane comprising an image and description of the Charlotte Motor Speedway, a Charlotte Motor Speedway event website, a dirt track news website, a buy race day tickets service, a race team social network profile, a race schedule and/or other search results relevant to "North Carolina Speedway").

The suggestion component 410 may be configured to identify a venue entity associated with the set of search results 406, such as a Charlotte Motor Speedway entity 408. The suggestion component 410 may be configured to evaluate user defined data to generate user defined suggestions 412 associated with the Charlotte Motor Speedway entity 408, such as a "get tickets ahead of time" user defined suggestion 414, a "the trackside seats are worth the extra price" user defined suggestion 416, a "don't park in the field if you have a truck with a lift" user defined suggestion 418, and/or a "big draft beers!!!!" user defined suggestion 420. For example, social network data may be evaluated to identify one or more candidate user suggestions relating to various aspects of the Charlotte Motor Speedway entity 408, such as tickets, seats, parking, food, etc. Such candidate user suggestions may be evaluated to generate the user defined suggestions 412. The suggestion component 410 may augment the set of search results 406 with the user defined suggestions 412.

Figure 5:
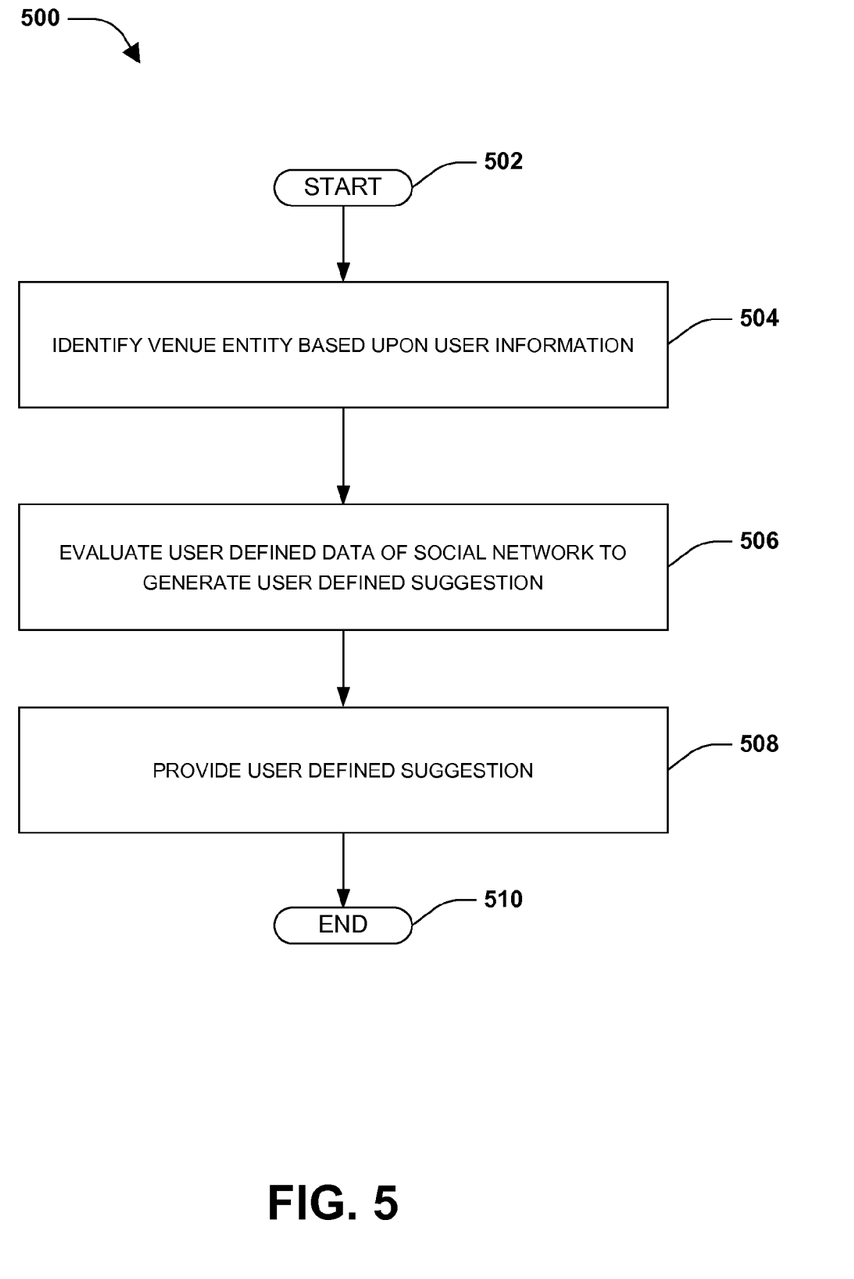
FIG. 5 is a flow diagram illustrating an exemplary method of providing a user defined suggestion.

An embodiment of providing a user defined suggestion is illustrated by an exemplary method 500 of FIG. 5. At 502, the method starts. In an example, user information may be associated with a user of a device. For example, the user information may comprise a calendar entry, a social network profile of the user, an email, a file associated with user, a current device location of the device, a task, a search task derived from search queries and/or a browsing session, and/or any other data/information associated with the user. At 504, a venue entity may be identified based upon the user information. In an example, a Central Park entity may be identified based upon a vacation calendar entry. In another example, an Akron Sports Stadium entity may be identified based upon an email regarding seeing an upcoming Akron baseball game.

At 506, user defined data of a social network (e.g., tips, opinions, advice, and/or other information specified by users of a social network) may be evaluated to generate a user defined suggestion associated with the venue entity. For example, a set of candidate user suggestions, corresponding to the venue entity, may be extracted from the social network (e.g., a "we caught a foul ball" candidate user suggestion, "the new scoreboard looks awesome" candidate user suggestion, and/or other candidate user suggestions derived from user specified information associated with the Akron Sports Stadium entity). The set of candidate user suggestions may be evaluated to generate the user defined suggestion as a descriptive summary of the set of candidate user suggestions. In an example, the user defined suggestion may correspond to a candidate user suggestion having a ranking above a threshold. In another example, the user defined suggestion may be constructed from information comprised within one or more user defined suggestions. At 508, the user defined suggestion may be provided to the device. In an example, the user defined suggestion may be displayed as an alert through the device (e.g., an alert message comprising the user defined suggestion may be displayed on a mobile device based upon the mobile device being located relatively close to the Akron Sports Stadium). At 510, the method ends.

Figure 6:
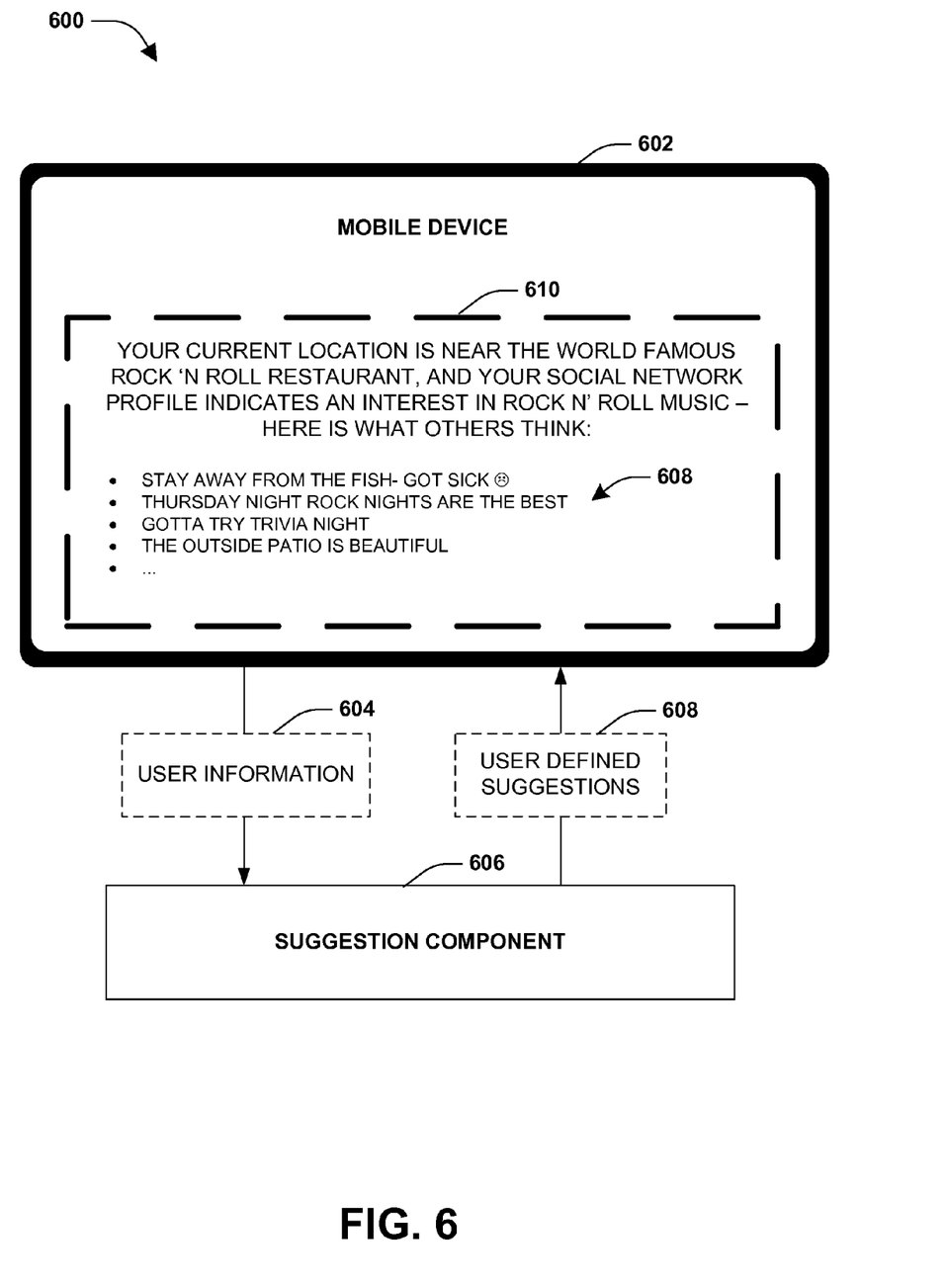
FIG. 6 is a component block diagram illustrating an exemplary system for providing a user defined suggestions.

FIG. 6 illustrates an example of a system 600 for providing user defined suggestions 608. The system 600 may comprise a suggestion component 606. The suggestion component 606 may be associated with a mobile device 602. The suggestion component 606 may be configured to identify a venue entity based upon user information 604 associated with a user of the mobile device 602. For example, the user information 604 may specify that a current location of the mobile device 602 is near a world famous Rock N' Roll restaurant, and that a social network profile of the user indicates that the user has an interest in Rock N' Roll music. In this way, the suggestion component 606 may identify a Rock N' Roll restaurant entity. It may be appreciated that the user may be been provided with an option to opt-in or opt-out with regard to providing the suggestion component 606 with access to the user information 604 (e.g., the user may have explicitly linked the social network profile to the suggestion component 606).

The suggestion component 606 may be configured to evaluate, mine, etc. user defined data of a social network (e.g., social network posts, blogs, microblog messages, websites, emails, conversations, articles, and/or other data sources through which users may specify tips, opinions, advice, and/or information associated with the Rock N' Roll restaurant entity) to generate the user defined suggestions 608 associated with the Rock N' Roll restaurant entity. For example, the user defined suggestions 608 may comprise user defined suggestions corresponding to fish, Thursday night rock nights, trivia night, an outside patio, and/or other information described by users of the social network. In an example the user defined suggestions 608 may be displayed as an alert message 610 through the mobile device 602.

Figure 7:
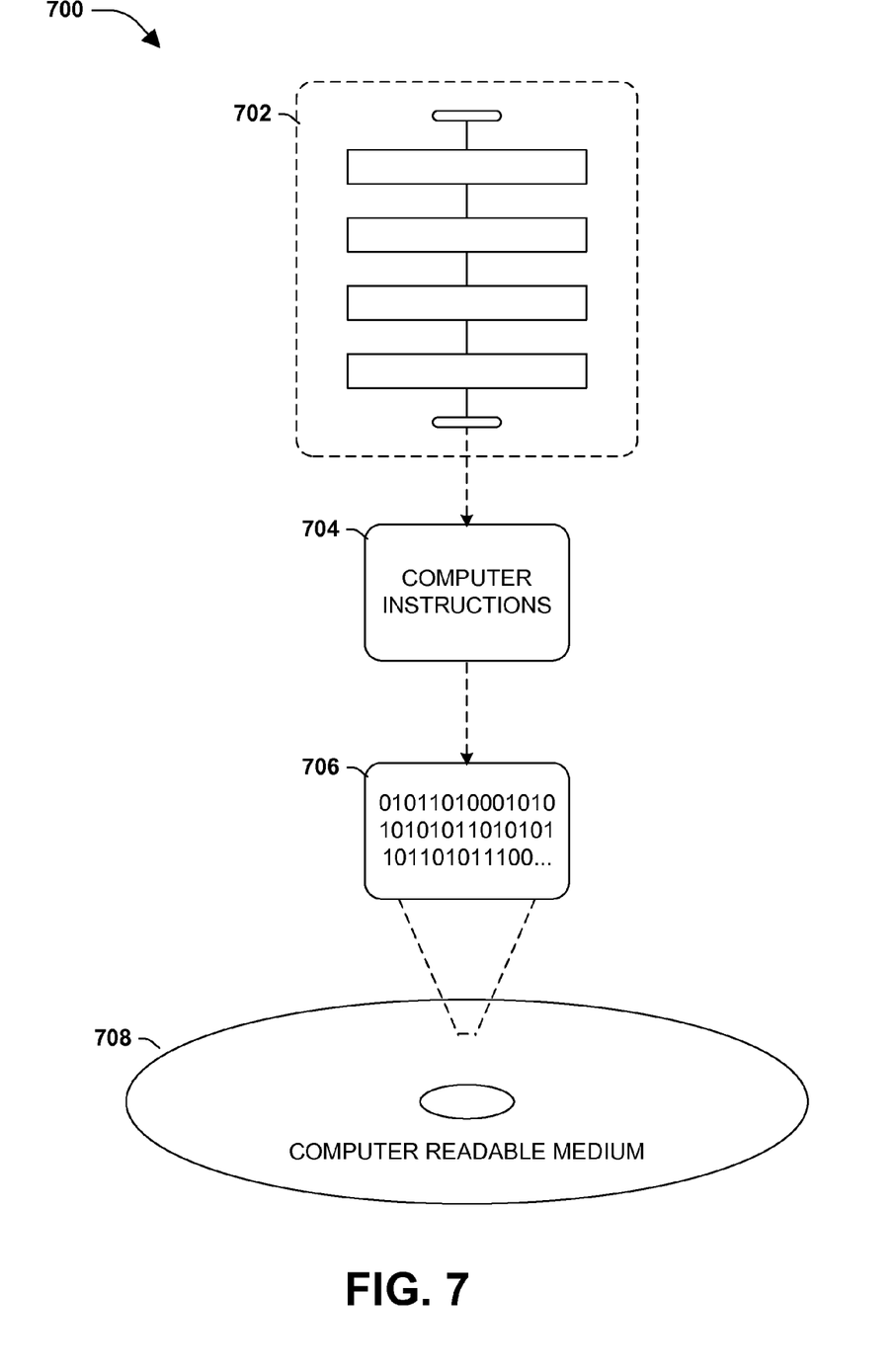
FIG. 7 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 100 of FIG. 1 and/or at least some of the exemplary method 500 of FIG. 5, for example. In some embodiments, the processor-executable instructions 704 are configured to implement a system, such as at least some of the exemplary system 200 of FIG. 2, at least some of the exemplary system 300 of FIG. 3, at least some of the exemplary system 400 of FIG. 4, and/or at least some of the exemplary system 600 of FIG. 6, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
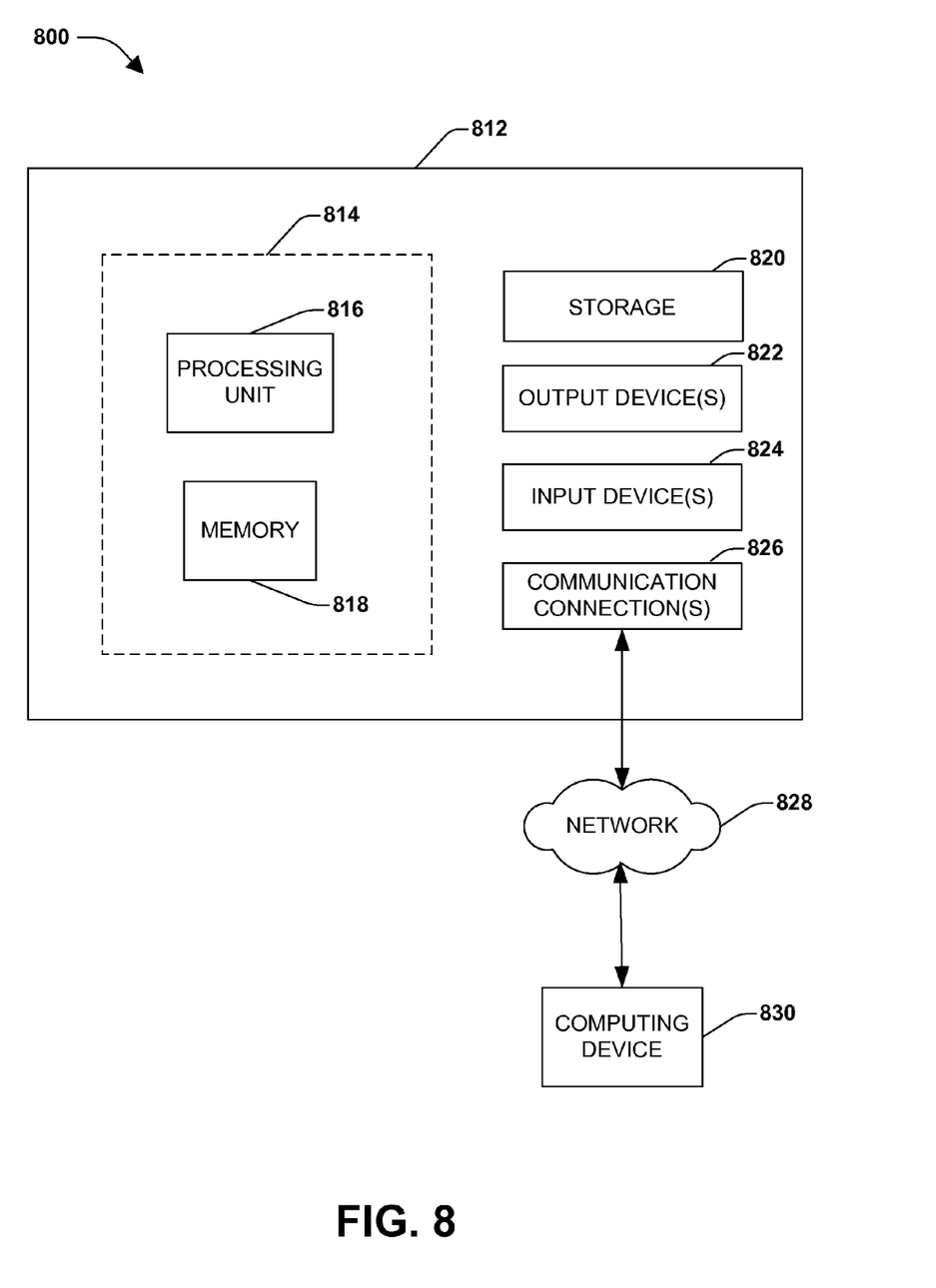
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 817. Depending on the exact configuration and type of computing device, memory 817 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 817 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 817 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 817 may be comprised of multiple physical memory units located in different physical locations interconnected by a network.

Those skilled in the art will realize that storage devices utilized to store computer readable instructions may be distributed across a network. For example, a computing device 830 accessible via a network 827 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for augmenting search results with a user defined suggestion, comprising:
    identifying a venue entity associated with a set of search results corresponding to a search query;
    evaluating user defined data to generate a user defined suggestion associated with the venue entity, the evaluating comprising:
        extracting a set of candidate user suggestions, corresponding to the venue entity, from a social network;
        generating a candidate graph comprising one or more nodes connected by one more edges based upon the set of candidate user suggestions such that a first node, representing a first candidate user suggestion, is connected to a second node, representing a second candidate user suggestion, by a first edge based upon the first candidate user suggestion corresponding to the second candidate user suggestion above a correspondence threshold;
        generating one or more suggestion category clusters based upon the candidate graph, a first suggestion category duster comprising one or more nodes connected by at least one edge; and
        evaluating the set of candidate user suggestions to generate the user defined suggestion, the evaluating comprising evaluating nodes within the first suggestion category cluster to generate the user defined suggestion as a descriptive summary of candidate user suggestions represented by the evaluated nodes within the first suggestion category cluster;
    augmenting the set of search results with the user defined suggestion to create an augmented set of search results; and
    providing the augmented set of search results in response to the search query.

2. The method of claim 1, the user defined suggestion corresponding to a first suggestion category, and the method comprising:
    augmenting the set of search results with a second user defined suggestion corresponding to a second suggestion category different than the first suggestion category.

3. The method of claim 1, the user defined suggestion corresponding to a first suggestion category, and the method comprising:
    augmenting the set of search results with a second user defined suggestion corresponding to the first suggestion category.

4. The method of claim 3, the providing the augmented set of search results comprising:
    displaying the user defined suggestion and the second user defined suggestion within a treemap in a ranked order, the user defined suggestion assigned a first popularity rank greater than a second popularity rank of the second user defined suggestion based upon a number of users discussing the user defined suggestion being greater than a number of users discussing the second user defined suggestion.

5. The method of claim 1, the augmenting the set of search results comprising:
    augmenting a location entity interface with the user defined suggestion.

6. The method of claim 1, the augmenting the set of search results comprising:
    identifying an image corresponding to the user defined suggestion; and
    augmenting the set of search results with the image.

7. The method of claim 1, comprising:
    responsive to a selection of the user defined suggestion, performing an action comprising at least one of a display image action, a display map location action, a display weather action, a display social network profile action, or a provide supplemental information action.

8. A method for providing a user defined suggestion, comprising:
    identifying a venue entity based upon user information associated with a user of a device;
    mining user defined data of a social network to generate a user defined suggestion associated with the venue entity, the mining comprising:
        extracting a set of candidate user suggestions, corresponding to the venue entity, from the social network;
        generating a candidate graph comprising one or more nodes connected by one more edges based upon the set of candidate user suggestions such that a first node, representing a first candidate user suggestion. is connected to a second node, representing a second candidate user suggestion, by a first edge based upon the first candidate user suggestion corresponding to the second candidate user suggestion above a correspondence threshold;
        generating one or more suggestion category clusters based upon the candidate graph, a first suggestion category cluster comprising one or more nodes connected by at least one edge; and
        generating the user defined suggestion as a descriptive summary of candidate user suggestions represented by the evaluated nodes within the first suggestion category cluster; and
    providing the user defined suggestion to the device.

9. The method of claim 8, the providing comprising:
    displaying the user defined suggestion as an alert through the device.

10. The method of claim 8, wherein the user information comprises at least one of a calendar entry, a social network profile of the user, an email, a file, a current device location of the device, a task, or data associated with the user.

11. The method of claim 8, wherein the mining the user defined data of the social network further comprises:
    identifying an image corresponding to the user defined suggestion; and
    providing the image together with the user defined suggestion.

12. The method of claim 8, further comprising:
    identifying the venue entity based upon a set of search results corresponding to a search query submitted by the user via the device;

augmenting the set of search results with the user defined suggestion to create an augmented set of search results; and providing the augmented set of search results in response to the search query.

13. The method of claim 8, further comprising performing an action, responsive to a selection of the user defined suggestion, the action comprising at least one of a display image action, a display map location action, a display weather action, a display social network profile action, or a provide supplemental information action.

14. A computing device comprising:
one or more processing units;
one or more computer-readable media comprising computer-executable instructions, which, when executed by the one or more processing units, cause the computing device to:
identify a venue entity based upon user information associated with a user of a searching device;
mine user defined data of a social network to generate a user defined suggestion associated with the venue entity, the mining comprising:
extracting a set of candidate user suggestions, corresponding to the venue entity, from the social network;
generating a candidate graph comprising one or more nodes connected by one more edges based upon the set of candidate user suggestions such that a first node, representing a first candidate user suggestion, is connected to a second node, representing a second candidate user suggestion, by a first edge based upon the first candidate user suggestion corresponding to the second candidate user suggestion above a correspondence threshold;
generating one or more suggestion category clusters based upon the candidate graph, a first suggestion category duster comprising one or more nodes connected by at least one edge; and
generating the user defined suggestion as a descriptive summary of candidate user suggestions represented by the evaluated nodes within the first suggestion category cluster; and
provide the user defined suggestion to the searching device.

15. The computing device of claim 14, wherein the user information comprises at least one of a calendar entry, a social network profile of the user, an email, a file, a current device location of the searching device, a task, or data associated with the user.

16. The computing device of claim 14, wherein the mining the user defined data of the social network further comprises:
identifying an image corresponding to the user defined suggestion; and
providing the image together with the user defined suggestion.

17. The computing device of claim 14, wherein the one or more computer-readable media comprise further computer-executable instructions, which, when executed by the one or more processing units, cause the computing device to further:
identify an image corresponding to the user defined suggestion; and
provide the image together with the user defined suggestion.

18. The computing device of claim 14, wherein the computer-executable instructions causing the computing device to provide the user defined suggestion to the searching device comprise further computer-executable instructions, which, when executed by the one or more processing units, cause the computing device to provide the user defined suggestion to the searching device by displaying the user defined suggestion as an alert through the searching device.

19. The computing device of claim 14, wherein the one or more computer-readable media comprise further computer-executable instructions, which, when executed by the one or more processing units, cause the computing device to:
identify the venue entity based upon a set of search results corresponding to a search query submitted by the user via the searching device;
augment the set of search results with the user defined suggestion to create an augmented set of search results; and
provide the augmented set of search results in response to the search query.

20. The computing device of claim 19, wherein the user defined suggestion corresponds to a first suggestion category, and wherein further the one or more computer-readable media comprise further computer-executable instructions, which, when executed by the one or more processing units, cause the computing device to further augment the set of search results with a second user defined suggestion corresponding to a second suggestion category different than the first suggestion category.

* * * * *